Feb. 20, 1951  A. D. EHRENFRIED  2,542,490
ELECTRICAL FIELD INTENSITY RECORDING SYSTEM
Filed Dec. 6, 1945  2 Sheets-Sheet 1

INVENTOR
Albert D. Ehrenfried

Feb. 20, 1951 A. D. EHRENFRIED 2,542,490
ELECTRICAL FIELD INTENSITY RECORDING SYSTEM
Filed Dec. 6, 1945 2 Sheets-Sheet 2

INVENTOR
Albert D. Ehrenfried

Patented Feb. 20, 1951

2,542,490

UNITED STATES PATENT OFFICE 2,542,490

ELECTRICAL FIELD INTENSITY RECORDING SYSTEM

Albert D. Ehrenfried, Boston, Mass.

Application December 6, 1945, Serial No. 635,369

9 Claims. (Cl. 246—33)

This invention relates to apparatus for investigating electrical fields and more specifically to such apparatus wherein the configurations of the fields are instantaneously and automatically recorded.

Heretofore, the task of determining the configuration of an electrical field was a tedious one involving crude, null devices and slow, inaccurate techniques for making a record of particular field points after they are found.

A specific object of the present invention is to provide apparatus for the simple, accurate, and rapid determinations of electrical field configurations.

Another object is to provide apparatus for the instantaneous and fully automatic recording of field points which satisfy a predetermined condition.

Another object is to provide apparatus adaptable to the investigation of both A.-C. and D.-C. electric fields.

A further object is to provide apparatus which may be adapted to automatically follow and record the contours of equipotential lines of an electrical field.

Another object is to provide apparatus adaptable to the investigation and automatic recording of radiated as well as confined electrical fields.

A still further object is to provide apparatus adaptable to the investigation and automatic recording of three dimensional space fields as well as plane fields.

To achieve these and other objects, apparatus of the present invention was conceived and is described in the following specification. The specification is accompanied by drawings of which:

Figure 1:
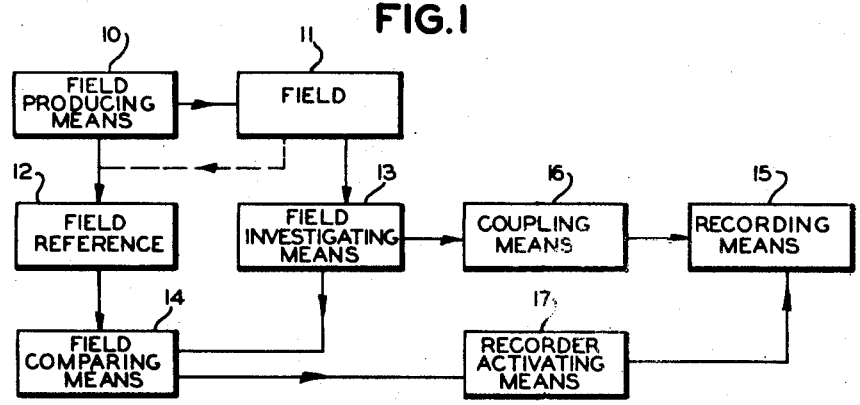
Figure 1 is a block diagram of the apparatus of the present invention.

Referring to the drawings and more specifically to Figure 1, a field producing means 10, and the field 11 resulting therefrom are shown. A field reference means 12 is provided which may be associated with the field producing means 10 or with the field 11, or may be totally independent of both. A field investigating means 13 is movably associated with the field 11, and the output of the investigating means 13 is compared with the field reference 12 in a field comparing means 14. A recording means 15 is associated with the investigating means 13 through a coupling means 16. The output of the field comparing means 14 operates a recorder activating means 17 which is in turn associated with the recording means 15.

The apparatus of the present invention as exemplified by the block diagram of Figure 1 functions in the following manner. The field producing means 10 develops a field 11 having a particular configuration which is unknown and sought. The field investigating means 13 is made to explore the field 11 and a field comparing means 14 compares the conditions of the field as found by the investigating means 13 with an adjustable field reference 12. A recording means 15 is instantaneously and automatically activated by a means 17 when the comparing means 14 finds that the field condition of the investigating means 13 bears a predetermined relation to the field reference 12. The recording means 15 is associated with the investigating means 13 through a coupling means 16 which causes motion of the investigating means 13 to be transferred proportionately to the recording means 15. The configurations automatically recorded by the recording means 15, thus bear a direct correlation with the configurations of points of the field 11 that are similarly related to the field reference 12.

Figure 2:
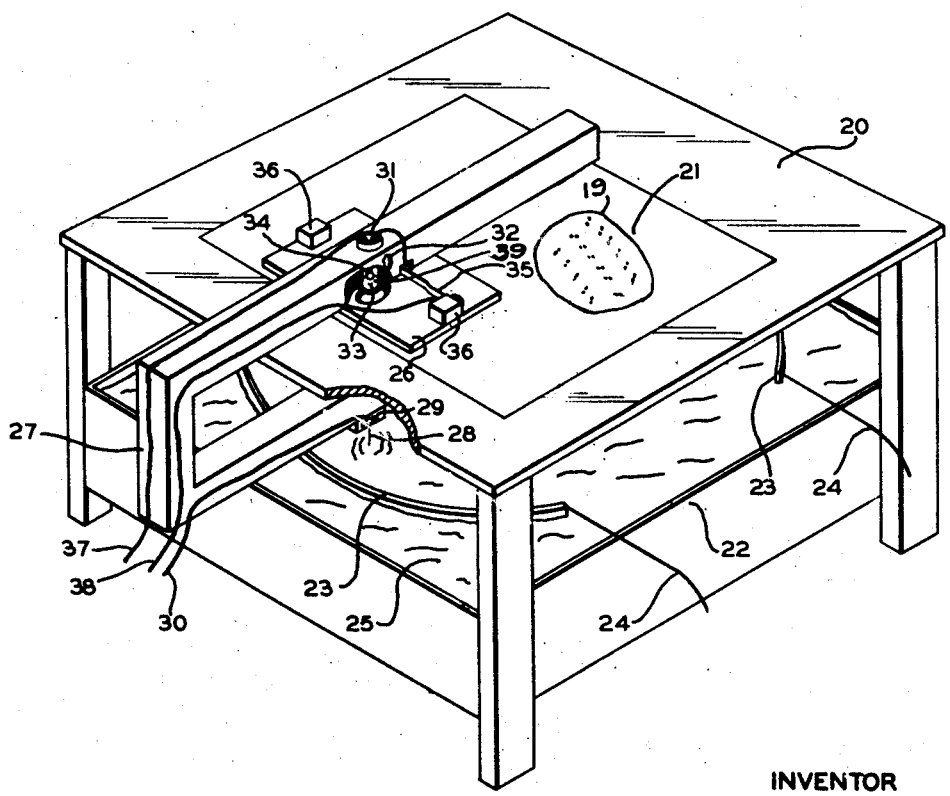
Figure 2 is a perspective view of one form of apparatus of the present invention.

A wide variety of devices may be adapted to embody the above principles and one possible form of apparatus is shown in Figure 2. A plane table 20 is shown having light sensitive paper 21 mounted on the upper surface thereof. Disposed beneath the table 20 and in vertical alignment with the paper 21 is a trough 22 containing a semi-conducting liquid medium 25 such as any well known aqueous electrolyte. Electrodes 23 are fixedly mounted in the trough 22. A voltage is applied across lead wires 24 attached to the electrodes 23, thus producing an electric field in the conducting medium 25 having an equipotential configuration determined by the geometrical shape and positioning of the electrodes 23.

A smooth, flat plate 26 having a rigid C-shaped arm 27 secured to the upper surface thereof is mounted in sliding agreement with the upper surface of the table 20 and the paper 21. Because of the substantial area and smooth surface of the plate 26, the entire C-shaped arm structure 27 can be moved freely and easily over the surface of table 20, with the arm 27 maintaining its vertical alignment with the horizontal plane of the table 20. Disposed in the lower member of the rigid arm 27 is a conducting probe 28 which skims the surface of the conducting medium 25. The probe 28 is adjustable in length and can be secured in a desired position by thumb screw 29. Flexible lead wire 30 connects the probe 28 as to a field comparing means to be later described.

Disposed in the upper member of the rigid arm 27 is a rotatable tube 31 which is secured in position by thumb screw 32. The lower end of the tube 31 is closed by an opaque disk 39 having an aperture 33 formed by two adjacent pin holes centrally disposed in the disk. The disk 39 moves in sliding agreement with the light sensitive paper 21 upon motion of the C-shaped arm 27. Mounted so as to shine through the aperture 33 is a small light bulb 34 which is turned on when it is desired to photographically record a mark in the form of an image of the aperture 33 on the paper 21. This photographic system constitutes a recording or marking means, and in this application for Letters Patent reference to such means is intended to include any device for changing the character of a record, such as by punching, burning, or stamping, as well as affecting the photographic character of a portion thereof.

Portion 19 of the record 21 shows the typical appearance of an area of photographically recorded marks which have been chemically developed after exposure in a manner common to photographic practice. These marks on portion 19 of the record 21 are images of the twin-holed aperture 33 and form smooth curves which, because of the fixed relationship between conducting probe 28 and aperture 33, represent equipotential lines of the field being analyzed. In practice, the record 21 is usually removed from table 20 for photographic development after the desired points have been recorded. In Fig. 2, a portion 19 of the exposed record 21 is shown developed while the record 21 is still in place on table 20 so as to ilustrate the positional relationship between recorded points and the field with which they are associated. Certain alternative marking means such as have been mentioned above would produce immediately visible marks positioned similarly to those of the portion 19 without the necessity for photographically processing the record 21.

To insure that the recorded marks which form one of the equipotentials are distinguishable from those of another line, the orientation of the aperture 33 is changed for each line by slight rotation of the tube 31 about its central axis. Portion 19 of Fig. 2 illustrates the resulting appearance of the record and demonstrates the desirability of using a rotatable aperture of irregular shape so that related marks are recognizable by their similar orientations. One of the two wires connected to the bulb 34 goes to a finger tip operating switch 35 which is used to prevent points from being photographically recorded while the apparatus is being aligned. The switch 35 is conveniently mounted near one of the two hand grip blocks 36. The remaining wire 37 connected to the bulb 34 and a wire 38 connected to the switch 35 are made of flexible conductor and are connected to a recorder activating means to be described later.

Figure 3:
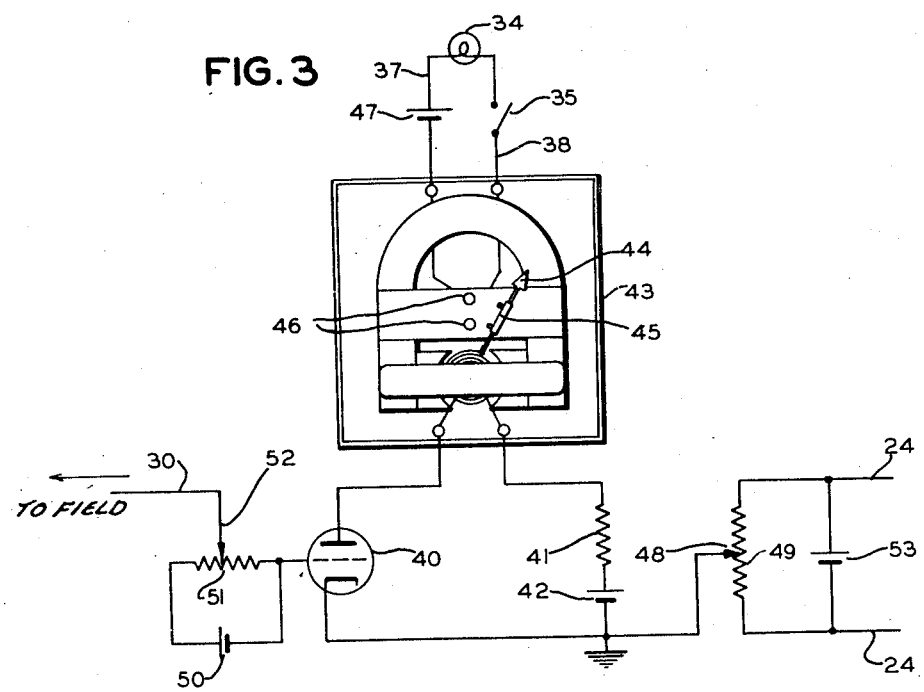
Figure 3 is a diagram of one form of D.-C. comparing and switching apparatus of the present invention.

A form of D.-C. field comparing and recorder activating apparatus is shown in Fig. 3. The electronic circuit comprises a single D.-C. amplifier stage 40 having plate load resistance 41 and plate voltage supply 42. A D.-C. milliammeter 43 is connected in the plate circuit of amplifier 40. Attached to the needle 44 of the milliammeter 43 is a contact wire 45 which bridges across two mercury pools 46 when the needle 44 is properly positioned. Plotting bulb 34, switch 35, and leads 37 and 38 of Fig. 2, as well as a battery 47 are connected to the mercury pools 46, and bulb 34 is thus turned on when operating switch 35 is closed and the proper value of plate current flows in amplifier 40 to position contact wire 45 across the mercury pools 46. Furthermore, it is desired that this proper value of plate current flow whenever the potential of the conducting probe 28 (Fig. 2) and its lead wire 30 is equal to the fixed reference potential selected by the potentiometer tap 48 on the resistor 49 which is connected across a source of D.-C. potential 53 and the field electrode lead wires 24.

To achieve this condition, the cathode of amplifier 40 is connected to potentiometer tap 48, and both are placed at ground potential for ease of understanding. A source of adjustable negative grid bias is introduced between the lead wire 30 and the control grid of the amplifier 40. The bias supply consists of a battery 50, a resistor 51, and a variable tap 52. The grid circuit is completed by lead 30 being returned to ground through the probe 28, the field medium, and the electrode circuit, as can be seen by correlating Figs. 2 and 3. To align the circuit, the lead wire 30 and the tap 48 are placed at a common potential, and the grid bias tap 52 is adjusted until the plate current of the amplifier positions the contact wire 45 across the mercury pools 46. Hereinafter, this condition of alignment of the contact wire and the mercury pools will immediately and automatically recur whenever the conducting probe 28 which is connected to the lead wire 30 is positioned on the equipotential line designated by the reference potential tap 48.

Figure 4:
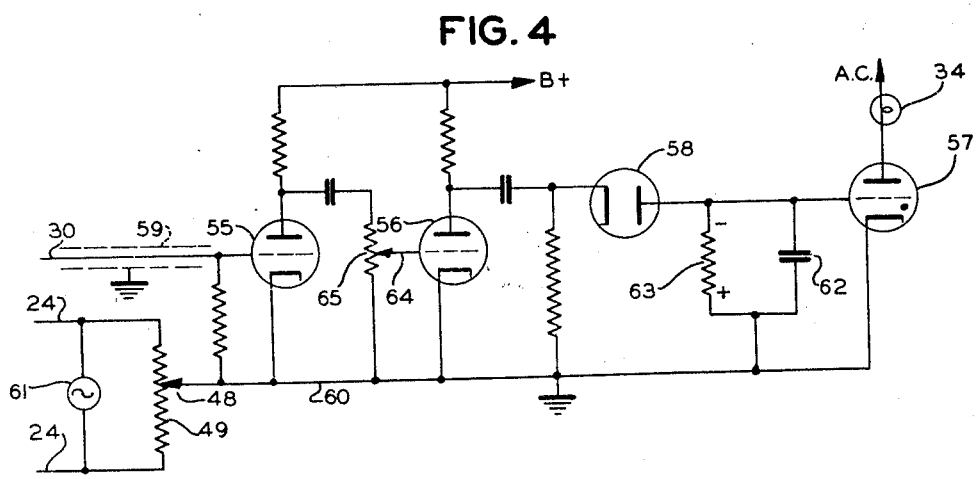
Figure 4 is a circuit diagram of one form of A.-C. comparing and switching apparatus of the present invention.

A form of A.-C. field comparing and recorder activating apparatus is shown in Fig 4. The electronic circuit comprises a first A.-C. amplifier stage 55, a second A.-C. amplifier stage 56 capacity coupled to the first stage 55 so as to be in cascade therewith, and an output switching tube 57 having a diode detector 58 in its grid circuit for providing control bias. The plotting bulb 34 of Fig. 2 is in the plate circuit of the output tube 57 which may be a gas discharge tube to provide sufficient conduction current to light bulb 34. Diode 58 is so connected that an A.-C. signal from the output of amplifiers 55 and 56 in cascade will place a negative bias with respect to ground on the control grid of output tube 57, and if the A.-C. signal is equal to or greater than a certain amplitude, the resultant negative bias will prevent the output tube 57 from going on.

The input control grid of first amplifier 55 is connected to the conducting probe 28 through the lead wire 30 which has grounded electric shielding 59 to prevent pick-up. The ground wire 60 of the circuit is connected to the potentiometer tap 48 on the resistor 49. Resistor 49 is connected across a source of A.-C. potential 61 and the field electrode lead wires 24. Potentiometer tap 48 provides a fixed but adjustable A.-C. reference potential, and whenever the conducting probe 28 and its lead wire 30 are at some A.-C. potential different from that of tap 48, an A.-C. signal appears at the input of the first amplifier 55. This difference signal is amplified by the stages 55 and 56, and turns off the output tube 57 and plotting light 34 by the grid biasing action of the diode 58. However, when the conducting probe 28 is positioned on the equipotential line designated by the tap 48, no A.-C. input signal exists, and the grid of output tube 57 rapidly returns to ground potential by the discharge of capacitor 62 through resistor 63. Output tube 57 and plotting light 34 are thus immediately and automatically turned on, making the desired photographic record of the equipotential point.

Sliding tap 64 on resistor 65 permits desired gain control, and when a thyratron output switching tube is used, its plate is connected through bulb 34 to an A.-C. potential to provide the necessary gas tube quench. If desired, the plotting light 34 can be controlled by a relay in the plate of output tube 57.

It will be obvious to those skilled in the art that a variety of recording or marking mechanisms may be substituted for the photographic means shown. By placing a conducting plate on the upper surface of the table 20 of Fig. 2 and by using a conducting electrode in the recording structure mounted in sliding agreement with the table 20, point marks can be made by the discoloration of paper by the flow of current therethrough or by the actual perforation of paper by a small electric arc. A pen or pencil activated by a solenoid can also be used for performing the desired recording function.

The techniques of the present invention as represented by the apparatus described herein are adaptable to all well-known field configurations, and may be employed to record the fields produced by more than two electrodes each of which may be held at a different potential. Three dimensional space fields may be plotted by adaptation of the apparatus described.

The coupling between the investigating means and the recording means is not limited to the direct linkage 27 shown in Fig. 2. Other devices such as a pantagraph or electrical servo or synchro positioning means may also be used.

The techniques of the present invention are also adaptable to the recording of the contours of radiated electromagnetic fields.

The invention set forth in the foregoing specification need not be limited to the details shown, which are merely illustrative of one form the invention may take. What I desire to secure by Letters Patent and claim is:

1. A device comprising a plane platform disposed horizontally and having light sensitive paper secured to the upper surface thereof, a trough of length and width dimensions comparable to those of said light sensitive paper being disposed beneath said platform and in vertical alignment with said light sensitive paper, said trough containing a semi-conducting fluid and metallic plates for setting up electrostatic fields in said fluid, a plotting light mounted in sliding agreement with said light sensitive paper and so positioned as to be above and shining down upon said paper, a small light aperture of unsymmetrical design disposed between said plotting light and said light sensitive paper and mounted so as to be rotatable about a vertical axis through said aperture, a conducting probe, adjustable in length, having one end touching the surface of said semi-conducting fluid, said probe being coupled to said plotting light by a rigid mechanical link, said mechanical link being adapted to maintain said probe and said plotting light aperture in vertical alignment, said mechanical link extending around an edge of said platform and being so formed as to permit said plotting light to move over the entire surface of said light sensitive paper, a source of voltage for exciting said field producing plates, a potentiometer provided across the terminals of said voltage source, said potentiometer having a sliding tap voltage reference point, electrical apparatus for comparing the voltage of said conducting probe with that of said voltage reference point and for turning on said plotting light when said two voltages are identical, whereby a point is photographically recorded whenever said conducting probe is on the equipotential line of said field corresponding to the potential of said voltage reference point.

2. Apparatus substantially as claimed in claim 1, said electrical comparing apparatus comprising a vacuum tube amplifier, the cathode of said amplifier being connected to said voltage reference potentiometer tap, a variable negative D.-C. bias potential connected between said conducting probe and the grid of said amplifier, a D.-C. plate voltage supply, a plate load resistor, and a D.-C. milliammeter connected in series with the plate of said amplifier, a contact wire attached to the needle of said milliammeter, said contact wire being formed with its two ends bent downward, two mercury pools so disposed beneath said meter needle as to receive the ends of said contact wire simultaneously when said meter needle is in the center region of its scale, a battery and said plotting light in series and connected to said mercury pools, whereby, with the negative bias of said amplifier adjusted so that said contact wire bridges across said mercury pools when said conducting probe is at the potential of said voltage reference, said contact wire bridges said mercury pools turning on said plotting light whenever said conducting probe touches the equipotential line designated by said voltage reference.

3. Apparatus substantially as claimed in claim 1, said electrical comparing apparatus comprising an electronic switching circuit including an amplifier whose input signal is the voltage between said conducting probe and said voltage reference point and an output switching tube having a biasing diode in its grid circuit, said diode being wired with its plate directly connected to the grid of said output tube and its cathode capacitively coupled to the plate of said amplifier, said diode being operated as a grid detector and having such conventional circuitry associated therewith as to permit an A.-C. signal of appreciable amplitude coming from said amplifier to bias off said output tube, said plotting light being controlled directly by said output tube so that said light is on when said tube is conducting and vice versa, whereby said plotting light is turned on when said conducting probe is positioned on the equipotential line selected by said voltage reference point.

4. Apparatus comprising a homogeneous semi-conducting medium, means for generating an electric field in said medium, means associated with said field generating means for providing an adjustable reference potential, a conducting probe in electrical contact with a surface of said semi-conducting medium and moveable relative to said electric field, a marking means coupled mechanically to said probe and adapted to produce a mark only when actuated by a predetermined signal, a potential comparing circuit comprising a difference amplifier and a relay electrically coupled to the output of said difference amplifier, means for coupling said reference potential and the potential of said probe to the input of said difference amplifier, said relay being adapted to close when the potential of said probe equals said reference potential, said relay being electrically coupled to said marking means and adapted to provide said marking means with said predetermined signal only during closure.

5. Apparatus comprising a homogeneous semi-conducting medium, means for generating an electric field in said medium, means for providing an adjustable reference voltage, a conducting probe in contact with said semi-conducting medium and moveable relative to said electric field, a marking means coupled mechanically to said probe and adapted to produce a mark only when actuated by a predetermined signal, a sensitive electrical relay having a coil coupled electrically to said reference voltage and said probe and being excited by the voltage difference between said two sources, said relay being adapted to close only when the difference between said probe and reference voltages falls below a specified minimum value, said relay being coupled electrically to said marking means and being adapted to provide said predetermined signal only during closure.

6. Apparatus for plotting the configuration of an equipotential line of an electric field, said apparatus comprising a homogeneous semi-conducting medium containing conducting electrodes shaped and positioned to provide a particular electric field, a source of potential connected to said electrodes to provide field excitation, a conducting probe in electrical contact with said medium and moveable therein, means for producing an electrical reference potential equal to that of a particular equipotential line, a marking means coupled to said conducting probe so that motion of one is transferred proportionately to the other, said marking means being adapted to produce a mark only when actuated by a predetermined signal, means fixed relative to said field for receiving the marks of said marking means, an electron tube, means for establishing the potential of a first electrode of said tube at said reference potential, means for electrically coupling said probe to a second electrode of said tube, said tube being adapted to amplify the difference in potential between said first and said second electrodes, a switch tube, means coupling said switch tube electrically to a third electrode of said first mentioned electron tube, said coupling means being adapted to actuate said switch tube when the potential of said probe equals said reference potential, said switch tube being electrically joined to said marking means and providing said predetermined signal when actuated.

7. Apparatus comprising a field producing means, means for investigating the field of said field producing means, a marking means coupled to said field investigating means and adapted to produce a mark only upon receipt of a predetermined electrical signal, an adjustable field reference, means for continuously comparing the signals of said field investigating means and said field reference, said comparing means being coupled electrically with said marking means and being adapted to generate said predetermined electrical signal when the signals of said field investigating means and said field reference bear a defined relation.

8. Apparatus for the automatic recording of electric field configurations, said apparatus comprising a semi-conducting medium having shaped electrodes fixed therein, a source of potential connected to said shaped electrodes for providing field excitation, a rigid surface parallel to and vertically displaced from an exposed surface of said semiconducting medium, means secured to said rigid surface for receiving marks, a rigid C-shaped structure vertically disposed with a first longitudinal portion in sliding agreement with said mark receiving means and a second longitudinal portion moveable over said exposed surface of medium, said first portion of C-shaped structure carrying means for producing marks on said mark receiving means, said marking means being adapted to produce a mark only upon receipt of a predetermined electrical signal, said second portion of C-shaped structure carrying a conducting probe which engages said exposed surface of medium, means for providing an adjustable reference potential, a potential comparing circuit comprising a potential difference amplifier and a switching circuit, means for electrically coupling the potential of said probe and said reference potential to separate electrodes of said potential difference amplifier, means for electrically coupling the output of said potential difference amplifier to said switching circuit, said switching circuit being adapted to actuate when the potential of said probe equals said reference potential, said switching circuit being joined electrically to said marking means and being further adapted to generate said predetermined electrical signal only when actuated.

9. Apparatus substantially as set forth in claim 8, said marking means being adapted to produce marks of a noncircularly symmetric shape, said marking means being rotatable relative to said first portion of C-shaped structure and about an axis held perpendicular to the surface of said mark receiving means, means for securing said marking means at any desired rotational position relative to said first portion of C-shaped structure, whereby the non-symmetric orientation of the recorded points can be varied to make the points distinguishable from one another.

ALBERT D. EHRENFRIED.

REFERENCES CITED

The following references are of record in the file of this patent:

UNITED STATES PATENTS

| Number | Name | Date |
|---|---|---|
| 1,825,855 | Craig | Oct. 6, 1931 |
| 1,919,215 | Gunn | July 25, 1933 |
| 2,368,217 | Hayes | Jan. 30, 1945 |
| 2,382,093 | Phelan | Aug. 14, 1945 |
| 2,440,693 | Lee | May 4, 1948 |

OTHER REFERENCES

Electron Optics, Theoretical and Practical, by Myers, 1939 edition, published by D. Van Nostrand Co., pages 122 to 142 inclusive. A copy is available in Division 54.

Text Book, Geophysical Exploration, by Heiland, 1940, Chapter 10, pages 681–706. Copy of this text in Division 48.